3,133,859
METHODS FOR CONTROLLING PARASITES ATTACKING CATTLE USING PHOSPHOROUS DERIVATIVES
James F. Landram, Angleton, and Lisby L. Wade, Lake Jackson, Tex., assignors to The Dow Chemical Company, Midland, Mich., a corporation of Delaware
No Drawing. Filed Nov. 3, 1961, Ser. No. 149,863
6 Claims. (Cl. 167—53)

The present invention relates to animal husbandry and is particularly directed to methods and compositions for controlling parasites attacking cattle and for improveing the growth characteristics of such animals.

Domestic animals are subject to attack by a number of different parasites including fleas, flies, lice, ticks, screwworms and cattle grubs as well as the helminthic parasites such as lungworms, stomachworms and gastrointestinal worms. The helminthic parasites include the strongyloids, cooperids and ascarids and are the causative agents of ascariasis, trichostrongylosis and gross parasitism. The helminths grow and mature in various organs but particularly the gastrointestinal tract of their host. In the usual life cycle, the ova pass out of the body with the fecal droppings, hatch and reach their infective stage, whereupon they are ingested during grazing, or as in the case with hookworms, enter the body through the skin. In the case of ascarids, the swallowed eggs or larvae mature usually in the digestive tract. In other cases, the maturing process may take place in other parts of the body such as the liver or the lungs as with lungworms. The parasites during maturation and growth have a very deleterious effect upon the animal and its rate of growth. In the intestine, the parasites erode the epithelial tissues bringing about hemorrhage, anemia, weakness and tissue necrosis. Animals, if they do not succumb to gross parasitism, are rendered economically unfit by weakness, lowered vitality and poor growth and reproduction. It is estimated that the losses accruing to the cattle industry of the United States from gross parasitism amount to about fifty million dollars per year, with yearly losses due solely to mortality running as high as nine million dollars.

One of the undesirable parasites in animals is the cattle grub. This grub is the larval form of the heel fly (*Hypoderma lineatum*), the bomb fly (*Hypoderma bovis*) or the botfly (*Dermatobia hominis*). The latter fly is found mostly in the Central and South American countries. The heel and bomb flies appear in the United States from February through August and fasten their eggs near the base of the hair on their host. The botfly is not seasonal in the Central and South American habitat and lays its eggs on an insect such as a mosquito or common fly which carries the eggs to the warm-blooded host. Following their attachment, the eggs of the various flies hatch in four or five days and the larvae bore through the skin of the host. The heel fly larvae migrate to the esophageal region or the abdominal viscera while the bomb fly larvae migrate through the spinal canal. During their life in the host, the larvae feed upon host tissue. After from about three to six months, depending upon the climatic conditions, the larvae locate in the skin and particularly the skin on the back of the host. Here, the larva opens a hole through the skin, usually in the choicest part of the hide, and grows rapidly for about six weeks. The larva thereafter leaves the animal through the hole in the skin, falls to the ground and shortly thereafter, depending upon the prevailing temperature, pupates for its transformation to the adult stage. The organisms cause considerable damage to the carcass of beef animals. In infested areas, losses from beef trimmings and prime leather run as high as ten dollars a carcass. Thus, the yearly loss to the cattle industries of the United States runs into the millions of dollars.

Another undesirable parasite is the screwworm fly (*Callitroga americana*). It can breed only in the tissues of living warm-blooded animals and it must depend upon finding a wounded or diseased part of the host's body in which its young can begin development. This parasite is particularly prevalent in southern and southwestern states and in Central and South American countries. In the areas where it normally occurs, it is one of the greatest enemies of all the insect species with which the livestock owner must contend. Under the present system of livestock production, man-made wounds occasioned by marking, branding, shearing, castrating, dehorning and docking afford ample and fertile breeding grounds for screwworms, as do injuries resulting from such plants as cacti and needlegrass, from fighting, from diseased tissues and from attacks of blood-sucking insects. Newborn animals are particularly susceptible to infestation of the navel scar.

The fly generally seeks the edges or a dry portion of the wound on which to deposit eggs. The eggs fasten tightly to the tissue surface in compact shinglelike masses. The eggs hatch in about 11 hours and the young whitish worms immediately burrow into the flesh where they feed and grow for a period of from 4 to 7 days. The worms, after attaining full growth in the wound, drop to the ground and change to pupa. After about from 7 to 60 days, they emerge as flies. The injury done to the animals is inflicted by the worms or maggots. The debilitating effect and the destruction of tissue may kill the infested animals in a few days. The screwworm destroys untold numbers of domestic and wild animals and this loss costs livestock owners many millions of dollars annually.

The treatment of these and other parasites by presently-employed methods has not been entirely satisfactory for obtaining adequate control. Some of the known materials have been of little efficacy, others impractical because of the frequency of treatment required and still others have an adverse effect on the metabolism of the treated animal. The need for simple and inexpensive methods for the control of parasites is well recognized as they constitute one of the major problems in animal husbandry.

It is an object of the present invention to provide a new and improved practice in animal husbandry. A further object is to provide an improved method for controlling parasites attacking cattle. Another object is the provision of a method wherein a systemic agent is employed for the control of parasites attacking cattle. An additional object is the provision of novel compositions adapted to be employed in the new method for controlling parasites. Other objects will become apparent from the following specification and claims.

It has been discovered that by employing certain phosphorus derivatives, good control of parasites attacking cattle may be obtained. Parasites which may be controlled by this new method include cattle grubs, bots, screwworms, ticks, lice, fleas, mites, helminths and other internal parasites and flies. Further, the new derivatives are found to be readily assimilable by cattle and to control parasites attacking the flesh, viscera or vascular system of the animals. The present compounds are effective for controlling parasites in all the life stages. Furthermore, the compounds are effective for controlling parasites attacking animals without adversely affecting the animals. Thus, these compounds are of low toxicity to cattle and in addition, they are effective at a very low concentration. Moreover, the compounds are not bound or incorporated or otherwise retained by fat and other tissues of cattle in the manner and to the extent that is the case with other compounds.

The practice of this invention may be accomplished by an oral administration of the agents, by spraying the animal with a composition comprising the active compound to permit absorption thereof through the skin or by injecting the animal with a suitable amount of the active compound. In the preferred method for carrying out this invention, the phosphoroate compound is administered to the animal to be treated by intramuscular injection. This method of treatment permits rapid absorption of the unaltered form of the phosphorus derivatives and further has the advantage of being an effective means for treatment of range and grazing animals. Furthermore, there is absence of sterile abscesses in their administration.

The phosphorus derivatives to be employed in the methods and compositions of the present invention are those corresponding to the structure

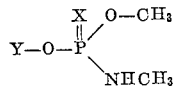

wherein X represents oxygen or sulfur and Y represents a radical selected from the group consisting of

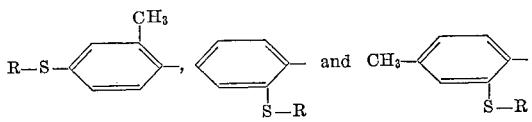

in which R represents methyl or ethyl.

The administration of a therapeutic dose, or dose sufficient to control the parasites without serious toxic effects on cattle, is essential and critical for the practice of the present invention. The exact dose to be administered is dependent upon the parasite to be controlled and the agent to be employed, as well as upon whether the administration is to be made in a single dose or in multiple doses over a period of several days. Where a single dose is employed for the control of helminth, good results are obtained when the compounds are administered at a dosage of from 10 to 30 milligrams per kilogram of body weight of the animal. For the control of flies, fleas, lice and ticks, good results are obtained when the phosphorus derivatives are employed at dosages of 5 milligrams per kilogram of body weight, while for the control of screwworms and cattle grubs, the phosphorus derivatives give good results at a dosage of 1.0 milligram or more per kilogram of body weight. If desired, the compounds may be administered in multiple doses over a period of a number of days. In such operations, it is preferred to employ a daily dosage of from 0.01 to 10 milligrams per kilogram of body weight.

The process of the present invention can be carried out by the subcutaneous injection of a phosphorus derivative in a suitable carrier. By suitable carrier is meant an inert liquid carrier which will not bring about degradation of the phosphorus derivative and further will not irritate or adversely affect the animal to be treated. Suitable carriers are well known to the artisans and include diethyl succinate, ethyl acetate, propylene glycol, ethyl lactate, diethyl adipate, peanut oil and sesame oil.

The method of the present invention can be carried out by the oral administration or feeding of the unmodified phosphorus derivatives. However, the present invention also embraces the employment of a liquid drench, powder, mash, pellet, bolus or other animal feed composition containing the phosphorus derivatives. In such usage, the compounds may be modified with one or a plurality of additaments or innocuous ingestible adjuvants such as water, ethanol, skimmed milk, syrups, edible oils, surface active dispersing agents such as the liquid and solid dispersing or emulsifying agents; and edible solid carriers such as edible powders, mineral and vitamin supplements and commercial feeds, concentrates and supplements. The compounds can also be administered as a spray, preferably in a non-aqueous medium such as an isoparaffin oil, the latter boiling in the range of kerosene, is characterized by low odor, low phytotoxicity and lower toxicity to animals than ordinary hydrocarbon oils of the same boiling range and contain no more than traces of olefins, naphthenes or aromatics and a low percentage of normal paraffins. Other liquid mediums oftentimes used for animal sprays such as kerosene, diesel fuel, as well as aqueous spray compositions wherein the phosphorus derivative is dispersed with a suitable surface active dispersing agent, can also be employed. Such augmented compositions are adapted to be administered to animals to supply the desired dose of active agent or to be employed as concentrates and subsequently diluted with additional carrier to produce the ultimate compositions. In the modified compositions, the carrier cooperates with the active ingredient to obtain an advantage and to contribute to the usefulness and effectiveness of the invention.

The exact concentration of the phosphorus derivatives to be employed in the compositions may vary provided that sufficient amount of the composition is administered to the animal so as to provide the required dosage of active agent. For example, where direct administration by intramuscular injection is to be employed, it is generally desirable that the ingestible solution contain a fairly high concentration of the active agent. In such operations, a liquid composition containing from 35 to 60 percent by weight of the agent is usually considered most practicable. Where direct oral administration to an animal is to be employed, liquid or solid compositions containing from 1 to 95 percent by weight of the phosphorus derivatives can be employed to supply the desired dosage. Where the compounds are provided as a constituent of the principal food ration, satisfactory results are obtained with food rations containing a minor but effective amount of the phosphorus derivatives. The exact amount of the compound to be incorporated in the ration is dependent upon the food consumption and feeding habits of the animals concerned. In cattle such as goats, swine, sheep, horses and cows, the required dosage can be supplied with feed compositions containing from 0.001 to 1 percent by weight of active agent. Where the compound is provided as a constituent of feed supplements, good results are obtained with supplements containing from 0.1 to 5 percent by weight of the phosphorus derivatives. In compositions to be employed as concentrates, the active agents can be present in a concentration of from 2 to 98 percent by weight.

Liquid compositions containing the desired amount of the phosphorus derivatives can be prepared by dissolving the compounds in ethanol or an edible oil or by dispersing them in water with the aid of a suitable surface active dispersing agent such as an ionic or non-ionic emulsifying and dispersing agent. Suitable surface active agents include the glycerol and sorbitan esters of fatty acids and the polyoxyalkylene derivatives of fatty alcohols and sorbitan esters. The aqueous compositions can contain one or more water-immiscible oils as a solvent for the active agent. In such compositions, the water, oil and emulsifying agent constitute an aqueous emulsion carrier.

In the preparation of solid feed compositions, the phosphorus compounds can be mechanically mixed with a finely divided edible solid such as flour or animal feed or a solid surface active dispersing agent such as finely divided bentonite, fuller's earth or attapulgite. These compositions can be administered in the form of bolus, capsule or tablet, or dispersed in an animal feed and such feed used to supply a part or the entire food ration. Alternatively, the phosphorus compounds can be dissolved in organic solvent, the resulting mixture dispersed in an animal feed and the feed dried to remove the solvent. Also the compounds can be dispersed in an edible oil such as coconut oil, olive or peanut oil and the resulting mixture dispersed in the feed. These edible oil compositions can contain one of the aforementioned surface active agents. Since many of the parasites are seasonal in their appearance, the present invention is advantageously practiced with certain parasites at a particular time of the year. Thus, with cattle grubs, *Hypoderma lineatum* and *bovis*, it is preferred that the administration for their control be carried out in the fall and quite soon after the disappearance of the heel and bomb flies. The disappearance of these flies varies somewhat depending upon the climate. For the control of the cattle grub, *Dermatobia hominis*, in the Central and South American countries, it is desirable that the administration be carried out about four times a year. When following such practices, good controls of cattle grubs are obtained with a minimum of damage to the animal from the migration of the grub. Further, the grubs are controlled before they have a chance to adversely affect the animal or its rate of growth, or reduce the value of the animal's hide.

The following examples merely illustrate the invention and are not to be construed as limiting.

*Example 1*

An ingestible solution of O-[4-(methylthio)-o-tolyl] O-methyl N-methyl phosphoramidothioate is prepared by dissolving the ester in diethyl succinate to provide a concentration of 500 milligrams of phosphoramidothioate per liter of solution. A portion of this composition is injected intramuscularly into the hip of a 203 kilogram calf heavily infested with cattle grubs, *Hypoderma lineatum*. The dosage of composition employed is sufficient to supply 5 milligrams of the phosphoramidothioate compound per kilogram of body weight. At the time of treatment, the back of the calf is found to have a number of nodular dermal cysts harboring live cattle grub larvae. Examination of the calf about two weeks following the administration shows a 100 percent kill of the cattle grubs.

*Example 2*

O-[2-(methylthio)-phenyl] O-methyl N-methyl phosphoramidothioate is employed for the control of screwworms in a wound in the area of the neck of a 325 pound calf. The phosphoramidate compound is administered in the form of a gelatin capsule and at a dosage of 5 milligrams per kilogram of body weight. Examination of the wound 24 hours following treatment shows a 100 percent kill of screwworms and marked healing with the wound scabbed over and of reduced size. Following the administration, there is observed no adverse effects upon the calf attributable to the treatment.

*Example 3*

O-[2-(ethylthio)-phenyl] O-methyl N-methyl phosphoramidothioate is employed as a systemic agent for the control of stable flies feeding on the skin surfaces of cattle. The formulation employed is prepared as described in Example 1 and the dosing operations also carried out as described in this example with the phosphoroate compound being administered at a dosage of 10 milligrams per kilogram of body weight.

One hour after injection, stable flies are allowed to feed on the skin of the animal for a period of 15 minutes and thereafter caged and observed for 24 hours for mortality of the flies. As a result of these operations, a substantially complete kill of stable flies feeding on the calf dosed with the phosphoramidothioate compound is obtained. Following the treatment, no adverse effect on the calf attributable to the phosphoramidothioate compound is observed.

*Example 4*

O-[2-(methylthio)-phenyl] O-methyl N-methyl phosphoramidothioate and O-[2-(methylthio)-phenyl] O-methyl N-methyl phosphoramidate are employed for the control of cattle grub in a field operation conducted in the late fall soon after the heel and bot flies have deposited their eggs. In such operations, five calves having an average weight of 400 pounds are intramuscularly injected with a solution containing 50 milligrams of O-[2-(methylthio)-phenyl] O-methyl N-methyl phosphoramidate per 100 milliliters of ultimate mixture. The other component is such composition is a 50/50 mixture of propylene glycol and ethanol. The amount of composition employed is sufficient to supply a dosage of 5 milligrams of the phosphoramidate compound per kilogram of body weight. In an additional operation, five calves having the same average body weight are orally administered O-[2-(methylthio)-phenyl] O-methyl N-methyl phosphoramidothioate in the form of a gelatin capsule and in an amount sufficient to supply 5 milligrams of the phosphoramidothioate compound per kilogram of body weight. Fifteen additional calves having an average body weight of about 400 pounds are left untreated to serve as checks.

At regular intervals, the treated and untreated cattle are examined for the development of nodular dermal cysts harboring live cattle grubs. Observations carried out over a period of three months show that the treated calves are free of cattle grubs whereas the untreated check group is found to have an average infestation of 9 cattle grubs per calf.

*Example 5*

A calf weighing 150 kilograms and voiding an average of 86.2 ova of gastrointestinal parasites per gram of feces is treated in oral administration with O-[2-(methylthio)-phenyl] O-methyl N-methyl phosphoramidate in the form of a gelatin capsule. The ova include those of *Bunastomum* sp., *Oesaphagostomum* sp., *Ostertagi* sp., *Trichostrongulus* sp. and *Cooperia* sp. The amount administered to the calf is sufficient to provide 20 milligrams of phosphoramidate per kilogram of body weight. Four days following the treatment, the feces are examined and found to be substantially free of the ova of gastrointestinal parasites.

*Example 6*

The phosphorus derivatives as set forth in the preceding examples and O-[2-(methylthio)-4-methylphenyl] O-methyl N-methyl phosphoramidothioate, O-[2-(methylthio)-4-methylphenyl] O-methyl N-methyl phosphoramidate, O-[4-(methylthio)-o-tolyl] O-methyl N-methyl phosphoramidate, O-[2-(ethylthio)-phenyl] O-methyl N-methyl phosphoramidate and O-[4-(ethylthio)-o-tolyl] O-methyl N-methyl phosphoramidate are each separately mixed and mechanically ground with kaolin clay, diatomaceous earth (Daxad number 27), and Nekal A to prepare concentrate compositions. In such opeartions, 25 parts by weight of phosphorus compound is employed with 44 parts of kaolin clay, 28 parts of diatomaceous earth, 2 parts of a polymerized sodium salt of a substituted benzoid alkyl sulfuric acid (Daxad No. 27) and 1 part of sodium naphthalene sulfonate (Nekal A).

Portions of each of these concentrate compositions are dispersed in water to prepare aqueous drench compositions containing 0.5 percent by weight of one of the phosphorus compounds. These drench compositions are orally administered to calves in the late fall soon after the heel and bot flies have deposited eggs and are found subsequently to give excellent controls of cattle grubs in the treated animals.

The phosphorus compounds, as employed in accordance with the teachings of the present invention, are prepared by reacting phosphorus oxychloride or phosphorus thiochloride successively with (1) methylamine, (2) methanol, and (3) an aryl alcohol corresponding to the formula:

In such procedure, the esterification and amidation reactions are carried out in any order and in the presence of an acid binding agent or hydrogen chloride acceptor such as a tertiary amine or an alkali metal hydroxide. Good results are obtained when employing substantially equimolecular proportions of the reagents and binding agent or chloride acceptor. Conveniently, the amidation is carried out in twice the proportion of the amidation reagent as the acid binding agent. In an alternative procedure, the esterifications are carried out by employing the alkali metal salt of the alcohols. In any event, the esterification and amidation reactions are carried out in a liquid reaction medium such as benzene or diethyl ether and take place readily at temperatures at which chloride is produced as a product of reaction. Good results are obtained when operating at temperatures of from $-10°$ to $80°$ C. Upon completion of the reaction, the desired product is separated by conventional procedures.

We claim:
1. A method which comprises administering to cattle a chemotherapeutic dosage of a compound corresponding to the formula

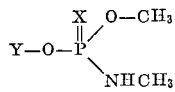

wherein X represents a member of the group consisting of oxygen and sulfur and Y represents a radical selected from the group consisting of

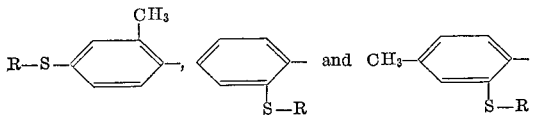

in which R represents a member of the group consisting of methyl and ethyl.

2. A method claimed in claim 1 wherein the phosphorus compound is O-[2-(methylthio)-phenyl] O-methyl N-methyl phosphoramidothioate.
3. A method claimed in claim 1 wherein the phosphorus compound is O-[2-(methylthio)-phenyl] O-methyl N-methyl phosphoramidate.
4. A method claimed in claim 1 wherein the phosphorus compound is O-[4-(methylthio)-o-tolyl] O-methyl N-methyl phosphoramidothioate.
5. A method claimed in claim 1 wherein the phosphorus compound is O-[4-(methylthio)-o-tolyl] O-methyl N-methyl phosphoramidate.
6. A method claimed in claim 1 wherein the phosphorus compound is O-[2-(methylthio)-4-methylphenyl] O-methyl N-methyl phosphoramidate.

References Cited in the file of this patent

UNITED STATES PATENTS
2,978,479    Kayser _____ Apr. 4, 1961

OTHER REFERENCES
Radeleff: J. Am. Vet. Med. Assn., vol. 136, No. 11, June 1960, pages 529–537.
Levine: Am. J. Vet. Res., vol. 29, 1958, pages 299–303.